UNITED STATES PATENT OFFICE.

THOMAS HARDMAN, OF SANTA MONICA, AND FRANK L. NORTHUP, OF OCEANPARK, CALIFORNIA.

CEMENT COMPOSITION AND PROCESS OF MAKING THE SAME.

1,244,326. Specification of Letters Patent. Patented Oct. 23, 1917.

No Drawing. Application filed November 8, 1915. Serial No. 60,429.

*To all whom it may concern:*

Be it known that we, THOMAS HARDMAN and FRANK L. NORTHUP, citizens of the United States, residing at Santa Monica and Oceanpark, respectively, in the county of Los Angeles and State of California, have invented new and useful Improvements in Cement Composition and Processes of Making the Same, of which the following is a specification.

This invention relates to a composition of matter and the method of making same, and particularly pertains to a cement or plastic composition which may be employed in coating the surfaces of wood, metal, stone, cement, brick, and other materials to prevent oxidation thereof and render the surface to which it is applied impervious to moisture.

It is the object of the invention to provide a cement of the above character which may be easily applied as a coating or built up in a mass, and which will solidify into an extremely hard body.

Another object is to provide a method for incorporating the ingredients of the composition whereby moisture is excluded and its oxidizing qualities enhanced.

Our composition consists of the following ingredients combined in substantially the following proportions; per one hundred pounds weight of the composition:

| | |
|---|---|
| Sand | 57 pounds |
| Whiting | 28 pounds |
| Linseed oil | 15 pounds |

These ingredients are prepared and mixed as follows:

The sand is subjected to the action of heat to practically remove moisture therefrom, being preferably heated to a cherry red. This heating of the sand is essential as it removes alkali and salt therefrom, the presence of which would render the plastic character of the composition imperfect. The whiting is also heated until thoroughly dry, and then mixed with the hot sand. The linseed oil (preferably boiled) is then added to the hot mixed sand and whiting and the ingredients thoroughly mixed. By mixing the sand, whiting and oil while heated the absorption of moisture by the whiting powder and sand is prevented. The sand forms a hard granular base and the whiting forms a soft powder which fills the interstices between the grains of sand, which readily mixes with the oil to form the whole into a plastic compound of pasty character.

This compound may be applied in its natural state, which is about the consistency of putty, or it may be thinned by the addition of oil or other suitable vehicle and flowed or spread on a surface as a paint.

This compound or composition, when in mass and excluded from air, will remain in its semi-liquid or pasty state, but when spread upon a surface or formed in a mass and exposed to atmosphere, will oxidize and solidify; the sand forming a medium which assists the oxidation of the oil which, on hardening, binds the powder and grains of sand to a solid homogeneous body. The cement thus formed is highly tenacious and will readily adhere to surfaces of various materials, as before mentioned; being capable of adhesion to glazed surfaces, such as glass or tile.

In applying the cement it is desirable to first coat the surface to be covered with boiled linseed oil to facilitate the adherence of the cement to the surface; the cement being applied either while the oil coat is wet or after it has dried.

Where the cement is to be applied as a coating for a surface, it might be found advisable to add a chemical for hastening oxidation, such as litharge or Japan drier, in the proportion of one-half pound of the drier to one hundred pounds of the composition.

Where the composition is used in mass, it is desirable to reinforce it by the addition thereto of fibrous matter, such as manila rope, one-half pound of which will suffice to one hundred pounds of the mixture.

What we claim is:

1. The composition of matter comprising sand, fifty-seven parts; whiting, twenty-eight parts; boiled linseed oil, fifteen parts; and fibrous material one-half part.

2. The method of forming a plastic composition, comprising heating sand to a cherry red to drive off moisture and alkalis, heating whiting and adding it to the hot sand and mixing boiled linseed oil with the sand and whiting.

3. The method of forming a plastic composition, comprising heated sand to drive off moisture and alkalis, heating whiting and adding it to the hot sand, mixing boiled linseed to the hot sand and whiting and adding fibrous material and a diluent to the mixture.

In testimony whereof we have signed our names to this specification.

THOMAS HARDMAN.
FRANK L. NORTHUP.

Copies of this patent may be obtained for five cents each, by addressing the "Commissioner of Patents, Washington, D. C."